Figure 1:
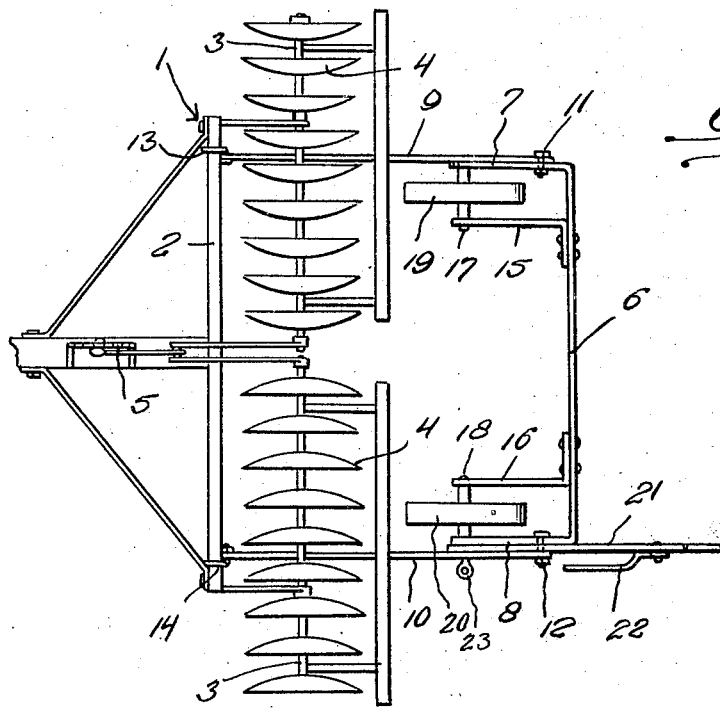

March 8, 1927.

A. WENNDT 1,619,904

TRUCK FOR DISK CULTIVATORS

Filed May 23, 1925

Inventor
Arnold Wenndt,
By Clarence A. O'Brien
Attorney

Patented Mar. 8, 1927.

1,619,904

UNITED STATES PATENT OFFICE.

ARNOLD WENNDT, OF LOWDEN, IOWA.

TRUCK FOR DISK CULTIVATORS.

Application filed May 23, 1925. Serial No. 32,348.

This invention relates to improvements in trucks and more particularly to one adapted to be detachably associated with agricultural implements such as disk cultivators or the like for enabling the implement to be transported from place to place when not in use, and more particularly for transporting an agricultural implement from its shed to the field.

A further object of the invention is to provide a truck of the above mentioned character, which is of such construction as to enable the same to be readily and easily attached or detached to the frame of a disk cultivator, when the disks are raised to an inoperative position, means being associated with the truck for lowering the frame thereof to permit the detaching of the truck from the implement, after the same has reached its destination.

A further object of the invention is to provide a truck of the above mentioned character, which is simple in construction, inexpensive, strong and durable, and further well adapted for the purpose for which it is designed.

Other objects and advantages of the invention will become apparent during the course of the following detailed description.

Figure 2:
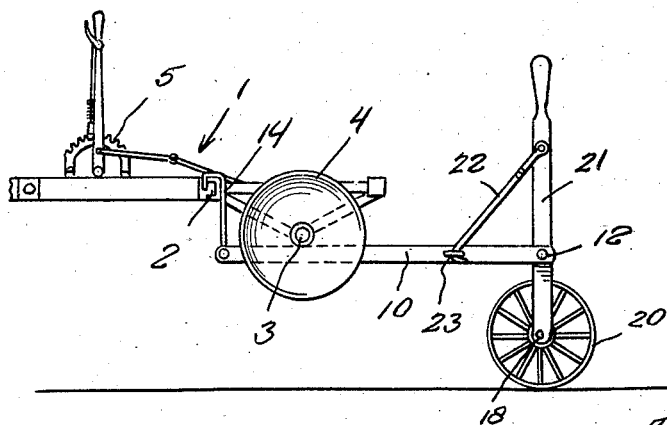

In the accompanying drawing, forming a part of this specification, and in which like reference characters indicate corresponding parts throughout the several views:

Figure 1 is a top plan view of the truck embodying my invention, showing the manner in which the same is attached to the frame of a disk-cultivator, the wheels of the truck being shown in their inoperative positions, and Figure 2 is a side elevation of the invention, showing the same in its operative position, attached to a disk cultivator.

In the drawing, wherein for the purpose of illustration is shown the preferred embodiment of my invention, the numeral 1 designates generally a disk cultivator of any well known construction, the same comprising the frame 2, on which is supported the shafts 3, the latter carrying the disks 4. These shafts are further adapted to swing upwardly so that the disks may be raised out of engagement with the ground when the cultivator is not in use, and a means usually provided for raising and lowering the disks is illustrated generally at 5. As this forms no important part of the present invention, a further detailed description thereof is not thought necessary.

My improved truck includes a substantially U-shaped frame 6, the arms 7 and 8 thereof having their free ends disposed toward the frame of the cultivator. A pair of elongated flat bars 9 and 10 are pivotally supported at their rear ends to the rear portions of the arms 7 and 8 respectively on the outer sides thereof, as illustrated at 11 and 12 respectively. A pair of hooks 13 and 14 are pivotally supported on the forward ends of the flat bars 9 and 10 respectively, and the purpose thereof will be hereinafter more fully described.

A pair of angular brackets 15 and 16 are secured to the crown portion of the substantially U-shaped frame 6, the arms of the angular brackets being spaced from the inner sides of the arms 7 and 8 respectively of the frame, and being of substantially the same length as the arms of the frame. An axle 17 is supported between the ends of the arms 7 and 15 respectively, and a similar axle 18 is supported between the free ends of the arms 8 and 16. Suitable ground engaging wheels 19 and 20 are mounted on the axles 17 and 18 respectively, as is clearly illustrated in Figure 1.

An elongated lever 21 is disposed intermediate the arm 8 of the U-shaped frame 6, and the rear portion of the flat bar 10, the lower end of the bar being secured to the outer side of the arm 8, through the medium of the pivot bolt 12 and the outer end of the axle 18, so that the lever 21 will swing on the pivot 12 simultaneously with the frame 6, in the manner as will be presently described. For the purpose of normally holding the lever 21 in an upright position and causing the substantially U-shaped frame 6 to be disposed in an inverted position, whereby the wheels 19 and 20 are in engagement with the ground, I provide a hook 22, which is pivotally secured, at one end, to the upper portion of the lever, the hooked end thereof being adapted for engagement with a suitable eye 23, which extends laterally from the rear portion of the flat bar 10.

When the truck is in use, the same is attached to the cultivator, by having the hooks 13 and 14 which are supported on the forward ends of the flat bars 9 and 10 extended over the angle iron beam of the frame 2 of the cultivator, and wheels of the truck being in engagement with the ground. It is to be understood, of course, that the disks 4 are in a raised position, and out of engagement with the ground. In this manner, the agricultural implement may be transported from its shed to the field.

In order to detach the truck from the cultivator, the hook 22 is disengaged from the eye 23, and by swinging the lever 21 rearwardly and downwardly, the frame 6 will swing upwardly on the pivot bolts 11 and 12, so that the wheels 19 and 20 will be raised out of engagement with the ground, and when the discs are lowered by actuating the mechanism 5 provided therefor, the hooks 13 and 14 may then be readily disengaged from the frame of the cultivator.

The provision of a truck of the above mentioned character will save considerable time and labor in transporting agricultural implements from the shed to the field where it is desired to use the implement. Furthermore, the hook may be attached to an agricultural implement, without necessitating any alterations on the implement.

While I have shown the preferred embodiment of the invention, it is to be understood that various changes in the size, shape, and arrangement of parts may be resorted to, without departing from the spirit of the invention or the scope of the appended claim.

What I claim as new is:

A truck for disk cultivators wherein the disks of the latter are adapted to be raised and lowered, said truck comprising a pair of elongated flat bars, a substantially U-shaped frame having its arms pivotally supported between the rear ends of the bars, a pair of angular brackets secured to the crown portion of the U-shaped frame, the longer arms of said angular brackets being disposed in parallel spaced relation with respect to the respective arms of the U-shaped frame, an axle journaled between each pair of cooperating arms, a ground engaging wheel mounted on each axle, a pair of hooks carried by the forward ends of said bars and adapted for engagement with the frame of the cultivator when the disks are in a raised position, a lever secured to the outer side of one arm of the U-shaped frame whereby said frame is adapted for swinging movement to facilitate the raising and lowering of the ground engaging wheels, and means for securing the frame in a rigid position to maintain the wheels in engagement with the ground, said means comprising an eye member extending laterally from the elongated flat bar which is adjacent the lever, and a hook carried by the lever and adapted for detachable engagement with said eye member.

In testimony whereof I affix my signature.

ARNOLD WENNDT.